UNITED STATES PATENT OFFICE.

JOHN S. ROBINSON, OF CANANDAIGUA, NEW YORK.

IMPROVEMENT IN PROCESSES OF HARDENING AND TOUGHENING THE CHILLED SURFACES OF CAST-IRON.

Specification forming part of Letters Patent No. 148,849, dated March 24, 1874; reissue No. 7,390, dated November 7, 1876; application filed September 3, 1875.

*To all whom it may concern:*

Be it known that I, JOHN S. ROBINSON, of the town of Canandaigua, county of Ontario, and State of New York, have invented a new and Improved Method or Process for Hardening and Toughening the Chilled Surfaces of Cast-Iron, so that such surfaces shall partake of the character, strength, and durability of steel, of which the following is a specification:

The nature and object of my invention are, primarily, to apply the process herein described to the mold-boards of plows; but the principle involved is susceptible of application to the surfaces of cast-iron of any other form or configuration equally as well, and with beneficial results.

In order to enable others skilled in the art to make, use, and employ this my method and process, I will proceed to describe the same.

The initial steps taken are similar to those taken in the production of castings, &c., and are as follows: A nowel-board is placed in a proper position to receive upon it what is denominated a "chiller," made of metal. Upon this is placed the mold-board or other pattern. Around both the chiller and pattern is then packed molding-sand, covering the sides of the same up to the upper surface of such pattern. The molding-sand is sloped downward to the nowel or bottom board. What is denominated "parting-sand" is then applied to the exposed surface, and the "cope" applied, which is filled and packed with sand, after which the cope is removed, and the pattern taken off from the chiller. The chiller is then removed, and heated sufficiently to expel all gases or moisture therefrom, after which it is readjusted to its former position in the mold. The cope is again replaced, and the molten iron then poured upon the chiller while the latter is yet warm, filling the place formerly occupied by the pattern.

The further manipulation of the material constitutes my improved process: The flask is then reversed, the bottom removed, and the chiller taken from the same, leaving the cast mold-board or other casting with its upper or chilled surface exposed while at a red heat. This casting is then covered with pulverized charcoal of sufficient fineness to come in contact with its whole exposed surface, by means of which the ignition of the charcoal is effected. The casting or mold-board while in its red state is not in a fit condition to be removed, but is in such a condition as to absorb from the charcoal a portion of the carbon which the latter contains, and in a more perfect manner than by any process known; and by means of this absorption upon and within this exposed surface I produce the result desired and claimed by me—of toughening and producing substantially a steel surface upon that part of the casting to which the material is applied.

It is considered that by this process cheapness and facility of construction are obtained to a degree hitherto unemployed and unknown; that the too rapid contraction of the chilled side of the casting is prevented; that the surface is more uniformly toughened and thoroughly carbonized, and thus is the tendency of the casting to become warped or cracked avoided.

What I claim as my invention, and desire to secure by Letters Patent, is—

The within-described process for carbonizing and toughening the surfaces of mold-boards of plows and other castings, it consisting in the application thereto of pulverized charcoal while portions of said castings are yet in an unfit condition to be removed from the molds, owing to the high degree of heat contained therein when the coal is applied, as set forth.

JOHN S. ROBINSON.

Witnesses:

SAMUEL G. METCALF,
HIRAM METCALF.